F. DOZE.
CANE STRIPPER.
APPLICATION FILED AUG. 1, 1914.
1,139,756.
Patented May 18, 1915.
2 SHEETS—SHEET 1.
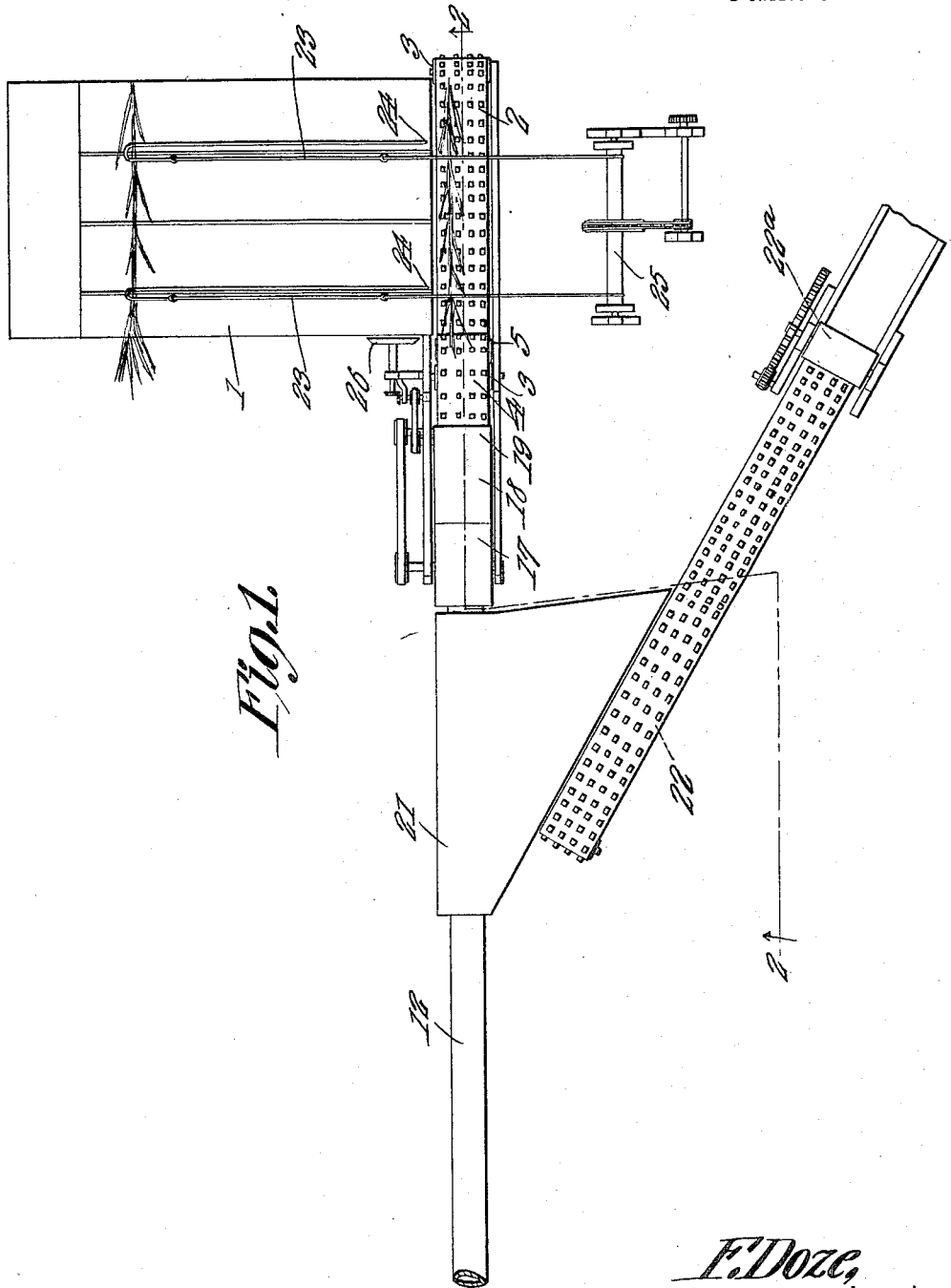
Witnesses
F. Doze,
Inventor
by C. A. Snow & Co.
Attorneys

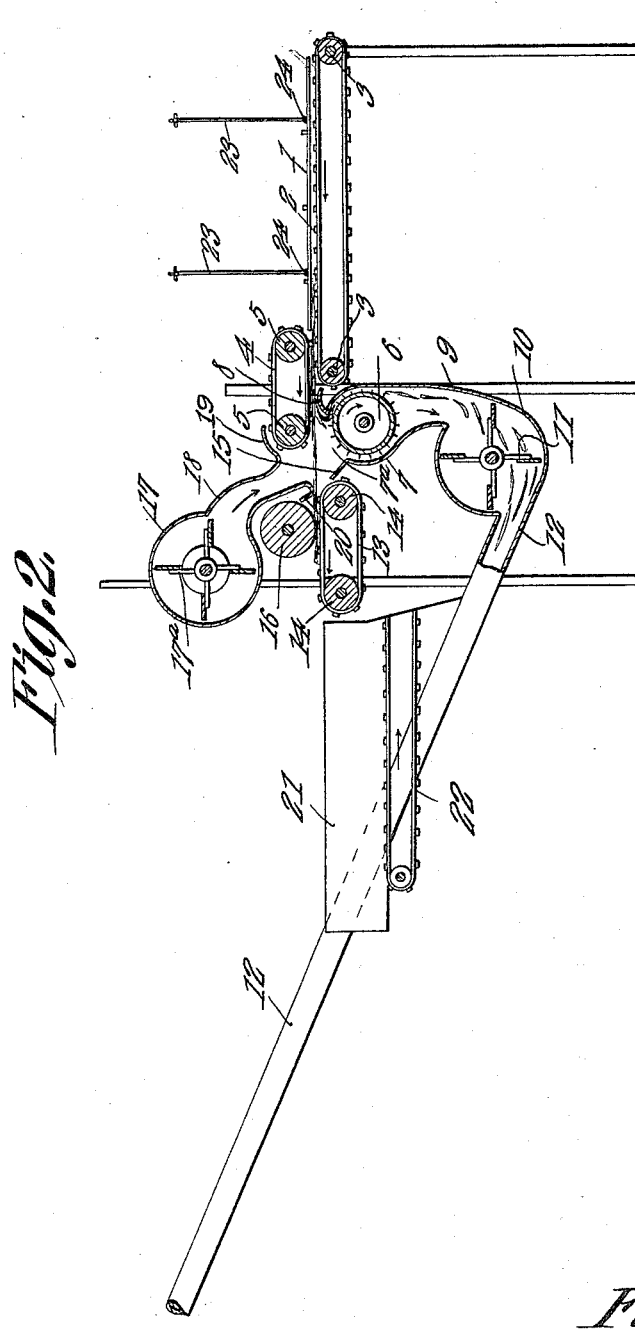

UNITED STATES PATENT OFFICE.

FRANKLIN DOZE, OF WALNUT, KANSAS.

CANE-STRIPPER.

1,139,756.  Specification of Letters Patent.  Patented May 18, 1915.

Application filed August 1, 1914. Serial No. 854,492.

*To all whom it may concern:*

Be it known that I, FRANKLIN DOZE, a citizen of the United States, residing at Walnut, in the county of Crawford and State of Kansas, have invented a new and useful Cane-Stripper, of which the following is a specification.

The present invention appertains to cane strippers, and aims to provide a novel and improved apparatus for stripping the leaves from the stalks of sugar cane.

It is the object of the present invention to provide a cane stripping machine which will be improved generally in its construction, so as to enhance the utility thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:—

Figure 1 is a plan view of the improved apparatus. Fig. 2 is a sectional view taken on the line 2—2 of Fig. 1.

In carrying out the present invention, there is provided a suitable platform or table 1, adapted to receive the bunches of sugar cane from a wagon, or the like, and an endless feed belt or apron 2 is mounted along one end of the table or platform 1 and is trained around the rollers 3. The apron or belt 2 is preferably provided with a longitudinal series of lugs as seen in the drawings, to receive and hold the stalks of cane in true longitudinal position.

In order to hold the stalks of cane upon the delivery or discharge end of the apron or belt 2, an upper endless apron or belt 4 is mounted upon rollers 5 above the delivery end of the belt 2, and the lower run of the belt 4 runs close to the upper run of the belt 2, to hold the stalks down, the belt 4 also being preferably provided with the lugs for assisting in holding the stalks against lateral displacement. The upper end of the belt 2 and the lower end of the belt 4 will move in the same direction, as indicated by the arrows in Fig. 2 to conduct or carry the stalks to the stripping device.

The stripping device embodies a rotatable stripping cylinder 6 which is mounted for rotation at the delivery end of the feed belt 2 within a suitable casing 7, the stripping cylinder 6 being provided with teeth or spurs upon its periphery for engaging or catching the leaves of the stalks and tearing them loose. That side of the cylinder casing 7 adjacent the delivery end of the belt 2, is provided with a forwardly curved flange or lip 8 extending below the belt 4 and to a point adjacent the upper run of the belt and the roller 3 at the delivery end of the said belt 2, whereby the stalks will be guided over the flange of lip 8 above the stripping cylinder 6. The casing 7 is provided with an upper mouth or opening 7ª adjacent which the flange or lip 8 is arranged, and over which the stalks are moved. The casing 7 is also provided with a downwardly extending discharge chute 9 which has a fan or blower casing 10 at its lower end, and in which is mounted a rotatable fan or blower 11 to draw a current of air downwardly through the chute 9 from the cylinder casing 7, the fan or blowing casing 10 having an inclined discharge flue 12 for discharging the leaves and refuse to stack the same.

An endless belt or apron 13 is mounted directly in rear of the cylinder casing 7, and upon the rollers 14, the rear side wall of the casing 7 being provided with an inclined lip or flange 15 extending to the receiving end of the belt 13 as clearly seen in Fig. 2. The upper run of the belt 13 is in substantially the same plane with the upper run of the feed belt 2 whereby the said belts will coöperate to carry the stalks over the mouth 7ª of the cylinder casing, while the belt 13 carries the stalks completely out of the stripping mechanism. A roller 16 is mounted above the belt 13, to hold the stalks down upon the upper run of the said belt, and the belt 13 is preferably provided with lugs to assist in holding the stalks in place.

As a means for forcing the leaves of the stalks down through the mouth 7ª of the cylinder casing 7 against the periphery or teeth of the cylinder 6, a fan or blower casing 17 is mounted above the roller 16 and contains a rotary fan or blower 17ª, the casing 17 having a downwardly extending outlet conduit 18 projecting between the belt 4 and the roller 16 above the mouth 7ª of the cylinder casing 7. The front wall of the conduit 18 is provided with a curved lip 19 extending partially over the belt 4, and the rear wall of the conduit 18 is provided with a flange or lip 20 extending close to the roller 16, whereby the flanges or lips 19 and 20 will serve to prevent the air from escaping and to assist in directing the air down into the cylinder casing 7. In this manner, the current of air is forced downwardly past the stalks and into the cylinder casing 7, this being assisted by the fan or blower 11 which draws the air downwardly from the casing 7. As a result, the current of air will force the leaves of the stalks down through the mouth $7^a$ of the casing 7 against the cylinder 6, and the teeth of the cylinder will consequently catch hold of the leaves to tear them loose. The side walls of the casing 7 are disposed comparatively close to the cylinder 6, to assist in holding the leaves of the stalks in engagement with the cylinder.

In rear of the discharge or delivery belt 13 is mounted an inclined transfer table 21, the same being inclined transversely of the machine, and a conveyer belt 22 extends along the lower edge of the transfer table 12, and its upper run moves toward the cane crushing mill $22^a$. The delivery belt 13 is adapted to move the stalks onto the transfer table 21, and the said table being inclined will cause the stalk to roll downwardly onto the conveyer belt 22 to transfer the stalks automatically from the stripping mechanism to the crushing mill.

As a means for feeding the stalks or cane from the table or platform 1 onto the apron or belt 2, cables or flexible elements 23 are anchored to the discharge end of the table or platform 1 adjacent the belt 2, as indicated at 24, while the other ends of the cables 23 are connected to a winding drum 25 which may be rotated to wind up the cables 23. The cables 23 preferably embody detachable sections, whereby the cables may be opened and passed around a bunch or quantity of cane placed upon the table 1. Thus, the stalks being placed upon the lower runs of the cables 23, and the upper runs of the cables passing over the stalks to the winding drum 25, will enable the stalks to be fed onto the belt 2, by winding up the cables upon the drum 25, the drum 25 being preferably disposed above or to that side of the feed belt 2 opposite the table 1. A rotary cutter 26 is mounted at the rear edge of the table or platform 1, and is adapted to cut the heads or tops above the stalks of cane, the cane being placed upon the table 1 with the heads or tops projecting rearwardly as indicated in Fig. 1, and whereby the stalks will be properly fed into the stripping mechanism to enable the leaves to be torn therefrom.

The belts, rollers and other parts of the apparatus are operated in any suitable manner, which need not be described or illustrated in detail, since the same is obvious to any one skilled in the art and may be altered in view of the various circumstances which might arise.

In operation, when the sections of the cables 23 are detached, a bunch or quantity of sugar cane may be placed upon the table or platform 1 from a wagon, or the like, and then, by attaching the sections of the cables 23, and by operating the drum 25, the cables 23 may be wound up to move the stalks toward and onto the feed belt 2. The stalks will then be taken up by the feed belt 2 and moved rearwardly into the stripping mechanism, assisted by the belt 4 which holds the stalks down. The stalks are thus passed over the mouth $7^a$ of the cylinder casing 7 and the downward current of air created by the fan or blower $17^a$ will force the leaves of the stalks downwardly into the casing 7 against the stripping cylinder 6, and as a result the stripping cylinder will catch hold of the leaves and tear them loose. The leaves will then be drawn down the chute 9 into the blower casing 10 and will be discharged through the flue 12 to stack the leaves and other refuse or to deliver the leaves to the point desired. The flange or lip 8 will support and properly guide the stalks over the mouth $7^a$ and the flange or lip 15 will direct the stalks properly onto the delivery belt 13, the delivery belt 13 taking the stalks and discharging them onto the transfer table 21. The stalks will then roll down the transfer table 21 on the conveyer belt 22 to automatically carry the stalks to the crushing mill $22^a$. The present apparatus is thus capable of receiving the stalks from a wagon and automatically feeding into the stripping device, in which event the leaves will be readily and effectively stripped from the stalks and discharged through the flue 12, while the stalks will be delivered automatically into the crushing mill without the necessity of handling them. The other advantages and attributes of the present apparatus will be obvious to those skilled in the art without further comment being deemed necessary.

Having thus described the invention, what is claimed as new is:—

1. In a cane stripping apparatus, a casing having an upper mouth, a stripping cylinder mounted within the casing, means for passing cane stalks over the mouth of the casing, and means for creating a current of air through the mouth of the casing to bring the leaves of the stalks into engagement with the stripping cylinder.

2. In a cane stripping apparatus, a casing having an upper mouth and a lower discharge chute, a stripping cylinder mounted within the said casing, a blower connected to the said chute for drawing a current of air through the said casing, and means for passing stalks of sugar cane over the mouth of the said casing.

3. In a cane stripping apparatus, a casing having an upper mouth, a stripping cylinder mounted within the cylinder, means for passing cane stalks over the mouth of the said casing, and a blower having a delivery conduit extending downwardly toward the mouth of the said casing for forcing the leaves of the stalks into said casing for the engagement of the said cylinder.

4. In a cane stripping apparatus, a feed belt, a delivery belt, a casing disposed therebetween and having an upper mouth, a stripping cylinder mounted within the said casing, one side of the said casing having a curved flange extended to the delivery end of the feed belt and adapted to support the cane stalks, the other side of the said casing having an inclined lip extended to the receiving end of the delivery belt to direct the cane stalks onto the said belt, and means for creating a current of air through the mouth of the said casing to bring the leaves of the stalks into engagement with the said cylinder.

5. In a cane stripping apparatus, a feed belt, a delivery belt, a casing disposed between the said belts and having an upper mouth, a stripping cylinder within the said casing, means disposed over each of the said belts for holding the cane stalks thereon, and a blower conduit extending downwardly between the said means toward the mouth of the said casing.

6. In a cane stripping apparatus, a stripping mechanism including a delivery belt, an inclined transfer table at the delivery end of the said belt to receive the cane stalks therefrom, and a conveyer belt extended along the lower edge of the transfer table.

In testimony that I claim the foregoing as my own, I have hereto affixed my signature in the presence of two witnesses.

FRANKLIN DOZE.

Witnesses:
 JOHN J. GEORGE,
 AL SHARP.

Copies of this patent may be obtained for five cents each, by addressing the "Commissioner of Patents, Washington, D. C."